United States Patent [19]
Mast

[11] 3,835,554
[45] Sept. 17, 1974

[54] MINI-SCALE SPACE MECHANICS SIMULATOR

[76] Inventor: John B. Mast, Rt. 2, Box 41, Weatherford, Okla. 73096

[22] Filed: May 9, 1973

[21] Appl. No.: 358,703

[52] U.S. Cl. .................................................. 35/45
[51] Int. Cl. ........................................... G09b 27/02
[58] Field of Search .......................... 35/42.5, 43, 45

[56] References Cited
UNITED STATES PATENTS

| 202,590 | 4/1878 | Schedler | 35/45 |
|---|---|---|---|
| 465,824 | 12/1891 | Moore | 35/45 |
| 659,817 | 10/1900 | Jones | 35/45 |
| 1,485,322 | 2/1924 | Winetzky | 35/45 |
| 1,838,942 | 12/1931 | Heid | 35/45 |
| 2,055,148 | 9/1936 | Hagner | 35/43 |
| 2,114,082 | 4/1938 | Mast | 35/45 |
| 2,287,594 | 6/1942 | Barbagelata | 35/45 |
| 2,418,718 | 4/1947 | Maginley | 35/45 |
| 2,550,805 | 5/1951 | Greenfield | 35/45 |
| 2,963,798 | 12/1960 | Trippensee | 35/45 |
| 2,985,969 | 5/1961 | Farquhar | 35/47 |
| 3,521,384 | 7/1970 | Holland | 35/45 |

Primary Examiner—Wm. H. Grieb
Attorney, Agent, or Firm—Dunlap, Laney, Hessin, Dougherty & Codding

[57] ABSTRACT

An improved space mechanics simulator having a sun model, an earth model and a moon model mounted to demonstrate the movement of each relative to the other and the relationship between the rotational speeds of each, the space simulator also including a scaled sun simulator and scaled planet models for demonstrating the relative sizes of the planet models with respect to the sun simulator and the distances therebetween. The space simulator also includes a calendar indicating plate, a moon phase indicator plate, a time chart, zodiac indicator plates, and a celestial sphere demonstrating the month, day, season, hour, the relative positions of the signs of the zodiac, phase of the moon, and the position of the various stars in rotated positions of the earth model and the moon model about the sun model.

14 Claims, 13 Drawing Figures

PATENTED SEP 17 1974 3,835,554

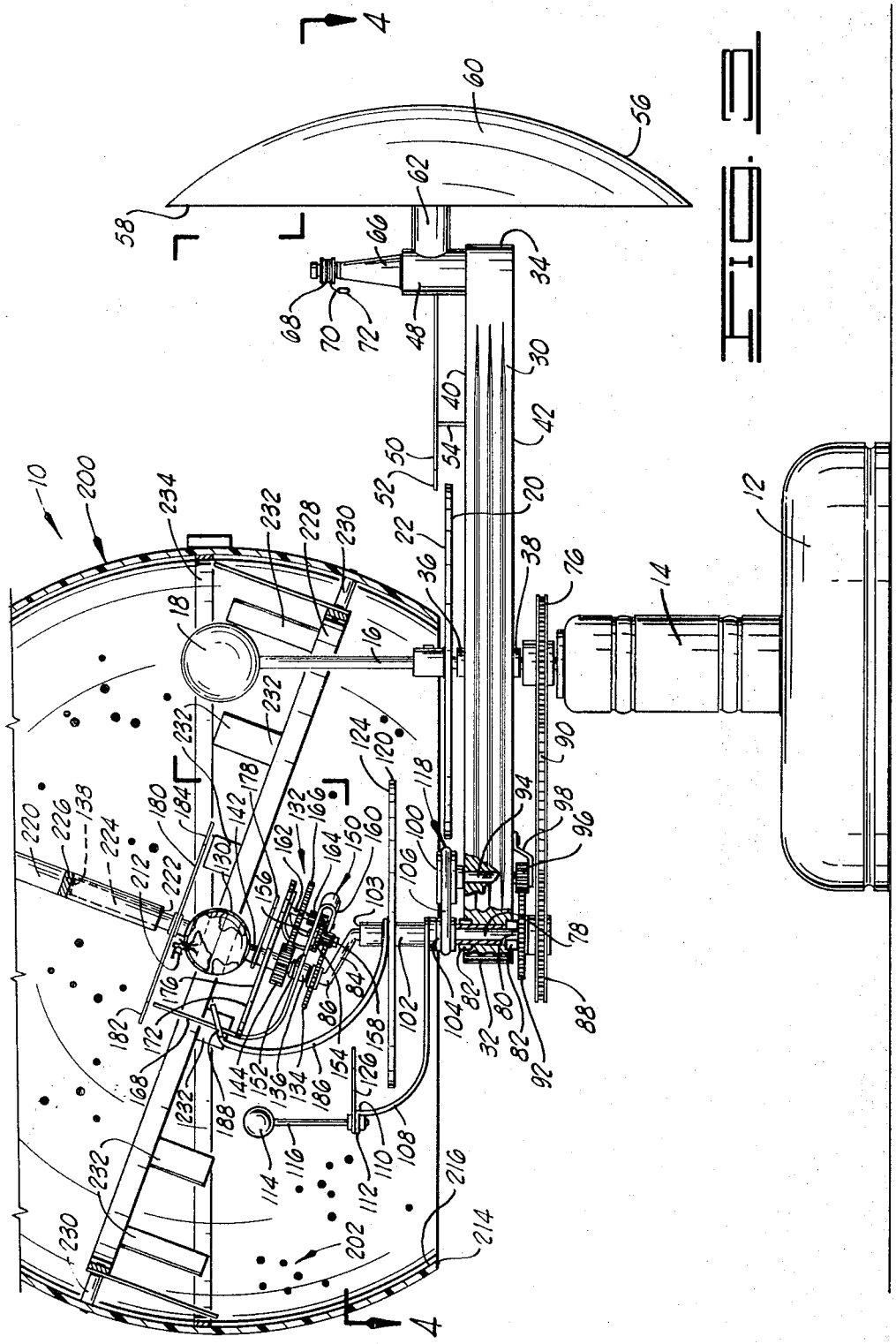

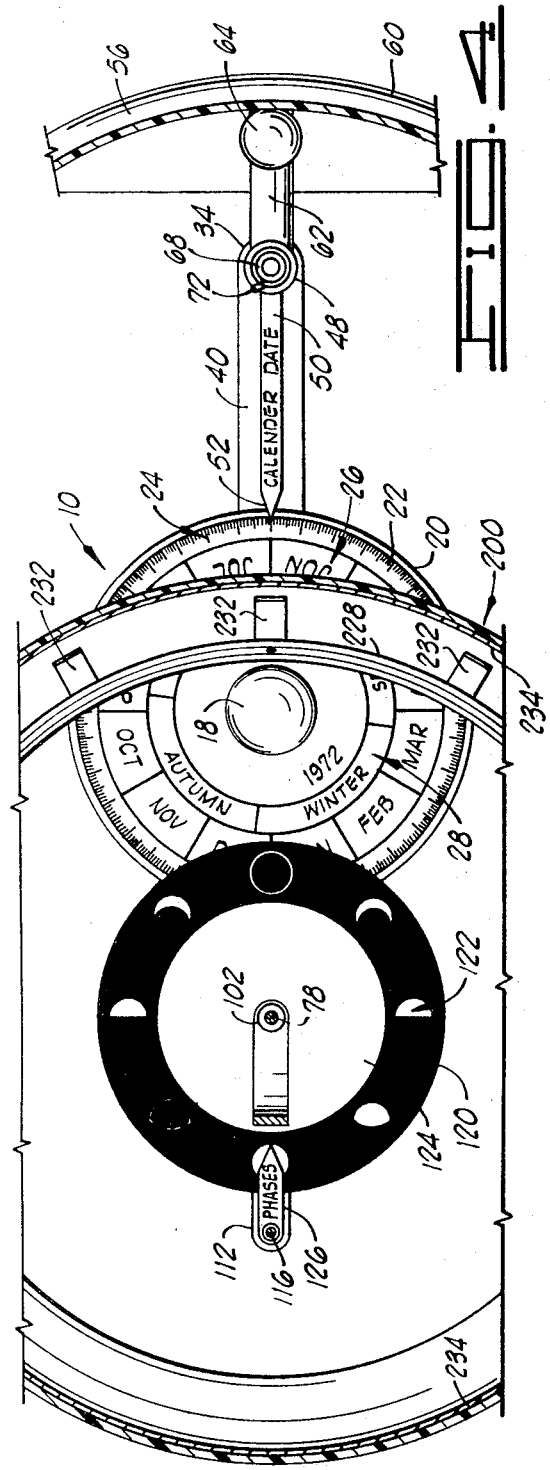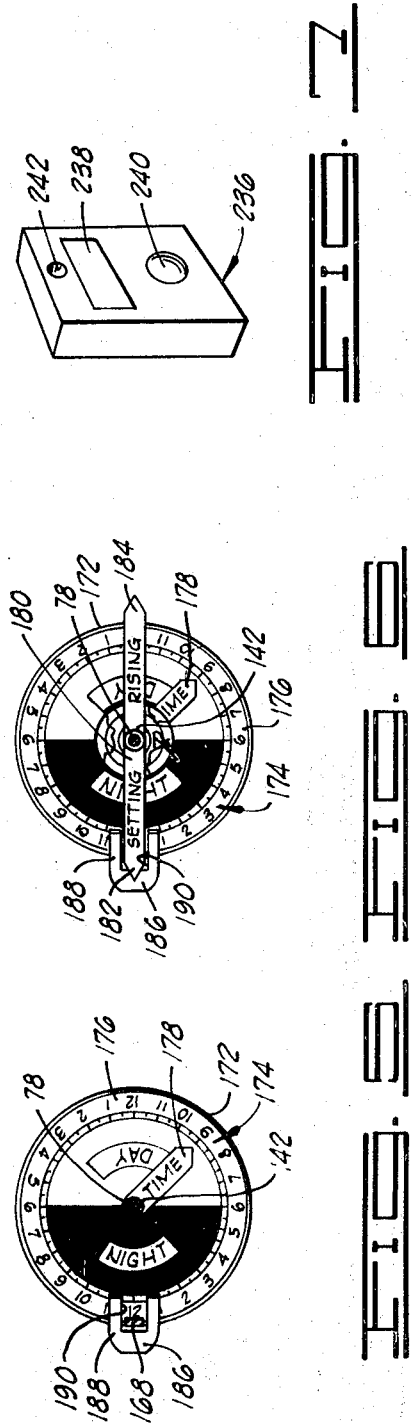

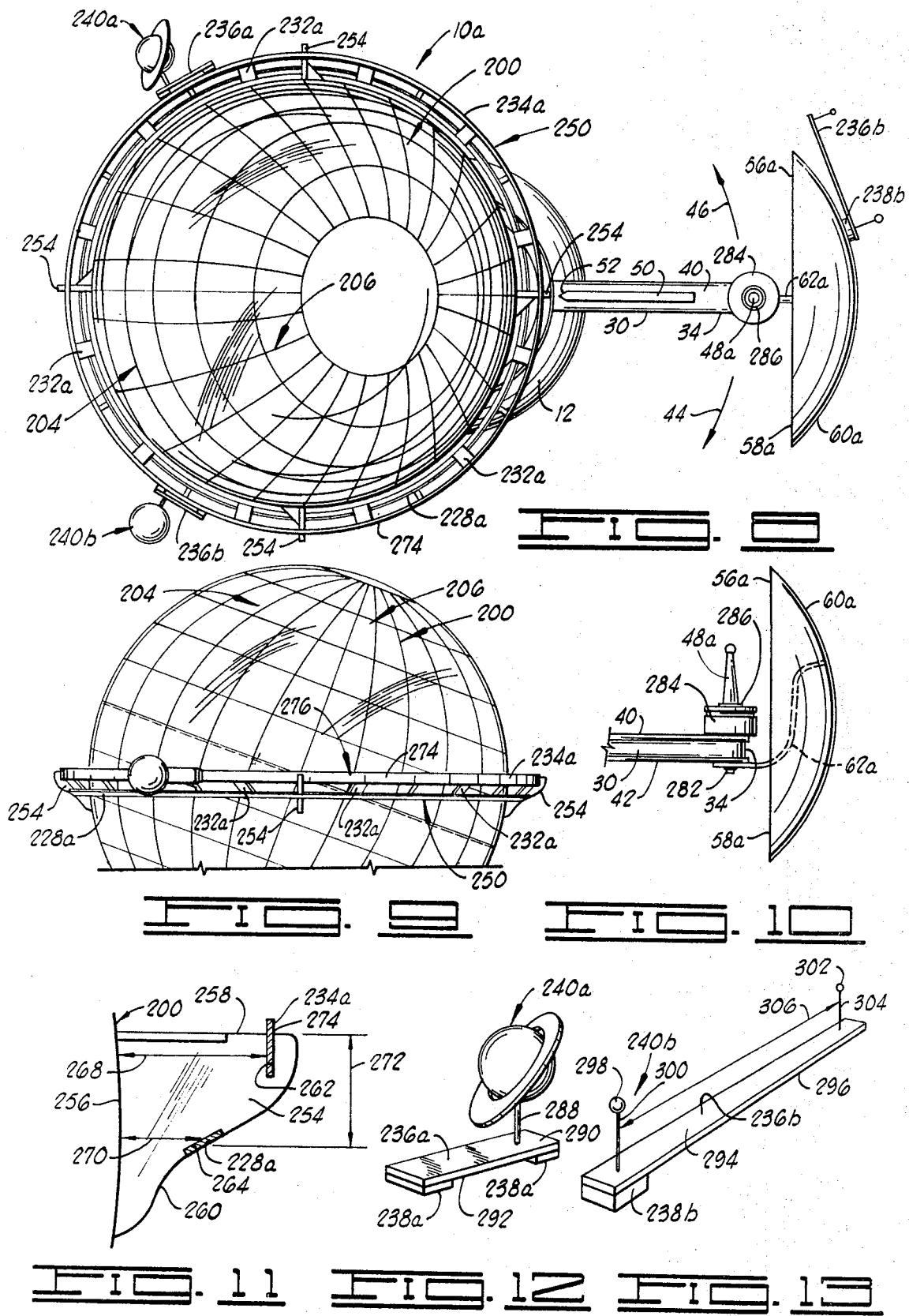

MINI-SCALE SPACE MECHANICS SIMULATOR

BACKGROUND OF THE INVENTION

1. Field of the Invention

The present invention relates generally to devices for indicating various astronomical phenomena and, more particularly, but not by way of limitation, to apparatus for demonstrating the relative movements of the earth, the moon and the sun, and other astronomical relationships including the relative sizes and distances of various planets with respect to the sun.

2. Brief Description of the Prior Art

In the past various tellurians or space simulator constructions have been proposed to demonstrate the movement and the relative movement of various planets. Some of the devices constructed in the past have been designed to visibly demonstrate the various planets moving in predetermined patterns and some of the devices have been constructed to observably demonstrate portions of the interrelated movements of various predetermined planets.

The U.S. Pat. No. 2,114,082, issued to John B. Mast, the inventor of the present apparatus, disclosed a tellurian having a sun globe and an earth globe and a moon globe, the earth globe and moon globe being supported on one end of an arm, the opposite end of the arm being pivotally connected to the shaft supporting the sun globe. The earth globe was supported on an incline portion of a shaft and the moon globe was rotated about the earth globe, the earth globe being supported for manual rotation about its axis. The arm was swung about the pivotal connection thereof to the shaft supporting the sun globe by a crank action and the moon globe was rotated about the earth globe via a gear arrangement connected between the shaft supporting the sun globe and the shaft supporting the earth globe. A calendar chart was mounted beneath the sun globe and a pointer was connected to the arm for cooperating with the calendar chart in a manner indicating the month, day and season, for example. A circular star chart showing the southern celestial hemisphere, for example, was supported on the shaft supporting the earth globe and positioned to facilitate the locating of various stars in the sky. Another star chart was supported above the earth globe's rotational shaft or axis, and an hour disc was revolvably mounted and maintained in a proper relationship for indicating time relative to the revolved positions of the various bodies.

Other apparatus designed to demonstrate various aspects of planet movement or the like were disclosed in the United States Patents: U.S. Pat. No. 1,838,942, issued to Heid; U.S. Pat. No. 2,055,148, issued to Hagner; U.S. Pat. No. 3,521,384, issued to Holland; U.S. Pat. No. 2,985,969, issued to Farquhar; U.S. Pat. No. 2,287,594, issued to Barbagelata, for example.

SUMMARY OF THE INVENTION

An object of the present invention is to provide an improved space simulator demonstrating the relative movement of the sun, the moon and the earth.

Another object of the invention is to provide an improved space simulator demonstrating the sizes of various planets relative to the sun and the relative distances between the planets and the sun.

One other object of the invention is to provide an improved space simulator demonstrating the relationship between the earth, the sun and the moon with respect to various stars and star groups at various positions of the earth and the moon relative to the sun.

A still further object of the invention is to provide an improved space simulator demonstrating the time-of-day, the calendar day, month and season, and the moon phase at various positions of the moon, the earth and the sun.

Yet another object of the invention is to provide a space simulator which is economical in the construction and the operation thereof.

Other objects and advantages of the invention will be evident from the following detailed description when read in conjunction with the accompanying drawings which illustrate preferred embodiments of the invention.

BRIEF DESCRIPTION OF THE DRAWINGS

FIG. 3 is a fragmentary, partial elevational, partial sectional view of the space simulator of FIGS. 1 and 2.

FIG. 4 is a fragmentary, partial plan, partial sectional view of the space simulator of FIGS. 1, 2 and 3, taken substantially along the lines 4—4 of FIG. 3.

FIG. 5 is an enlarged, top plan view of the time chart and time indicator of the space simulator of FIGS. 1 through 4.

FIG. 6 is a top plan view similar to FIG. 5, but also showing the pointer for indicating the rising and the setting positions of the sun model of the space simulator of FIGS. 1 through 4.

FIG. 7 is a front elevational view of a typical planet plate supporting a planet model of the space simulator of FIGS. 1 through 4.

FIG. 8 is a top plan view, similar to FIG. 2, but showing a modified space simulator.

FIG. 9 is a fragmentary, side elevational view of the modified celestial sphere of the space simulator of FIG. 8.

FIG. 10 is an enlarged side elevational view showing the modified sun simulator of the space simulator of FIG. 8.

FIG. 11 is an enlarged side elevational view showing one of the support arms supporting the support band of the modified space simulator of FIG. 8.

FIG. 12 is an enlarged perspective view showing a modified planet plate supporting a planet model.

FIG. 13 is an enlarged perspective view, similar to FIG. 12, but showing a planet plate supporting a modified planet model.

DESCRIPTION OF THE PREFERRED EMBODIMENTS

Figure 1:
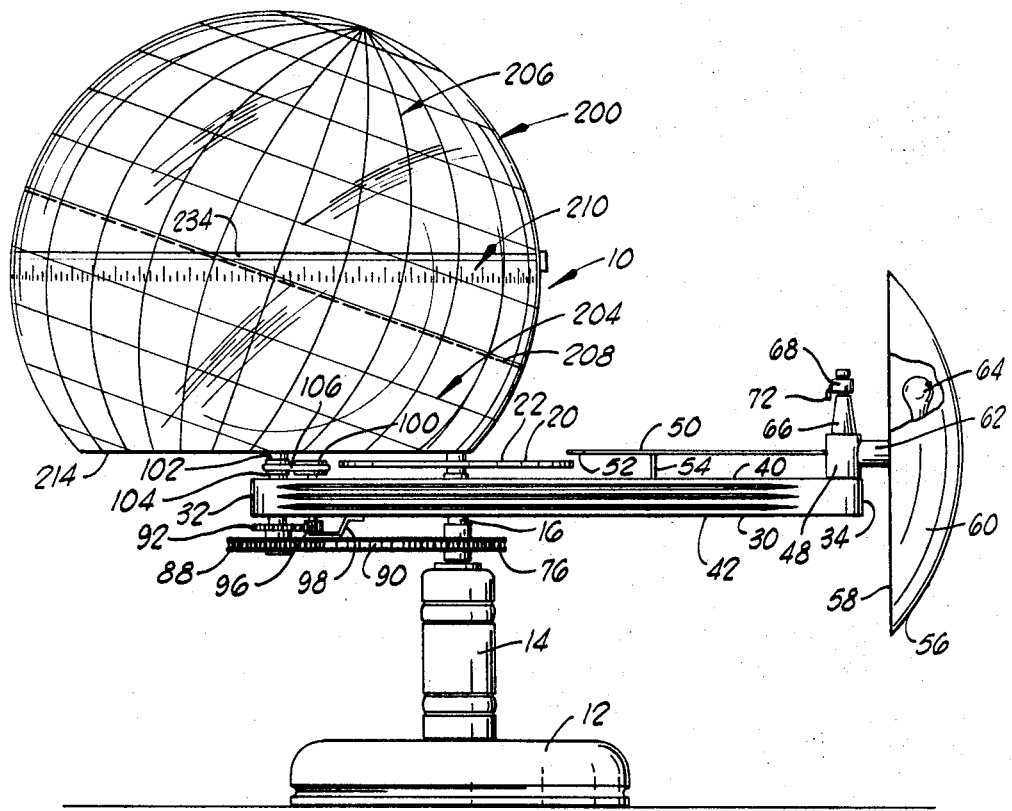
FIG. 1 is a side elevational view of the space simulator of the present invention.
Figure 2:
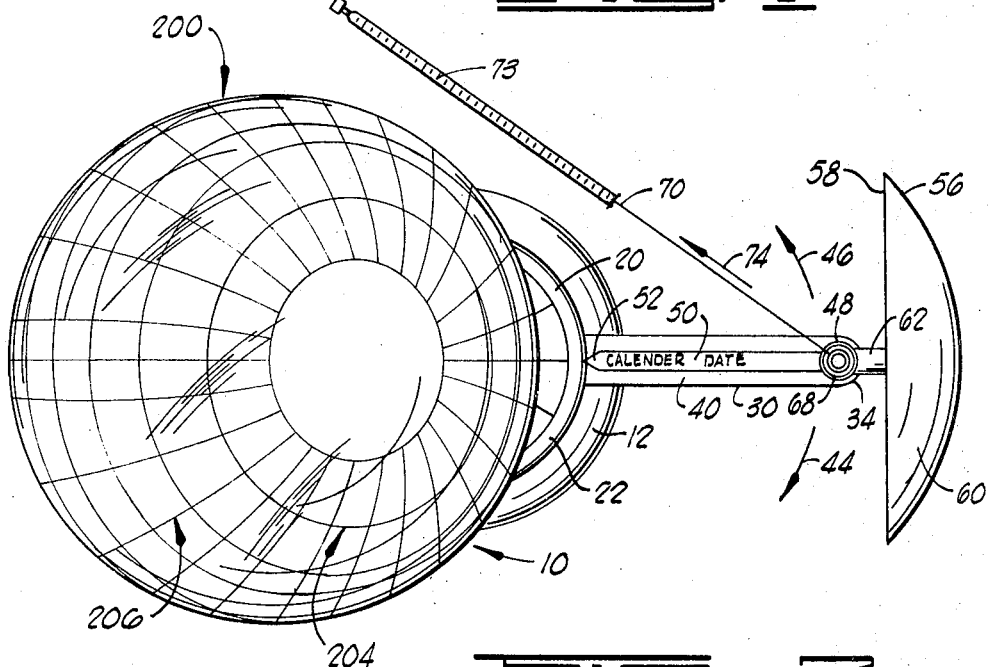
FIG. 2 is a top plan view of the space simulator of FIG. 1.

Referring to the drawings in general, and to FIGS. 1, 2, 3 aand 4 in particular, shown therein and designated by the general reference numeral 10 is a space simulator constructed in accordance with the present invention, the space simulator 10 sometimes being referred to in the art generally as a "tellurian." The space simulator 10 is particularly useful as an educational device providing visual, observable simulations demonstrating various astronomical relationships in a manner facilitating and enhancing the student's or individual's understanding and perception of the various relationships, in a manner to be described in greater detail below.

The space simulator 10 includes a base 12 and a post 14 secured to a central portion of the base 12 and extending generally vertically upwardly or perpendicularly therefrom. One end of a sun shaft 16 is secured within a portion of the post 14, the sun shaft 16 extending a predetermined distance generally vertically upwardly from the base 12, as shown more clearly in FIG. 3. The sun shaft 16 is, more particularly, secured to the post 14 of the base 12 such that the sun shaft 16 remains in a fixed, stationary position during the operation of the space simulator 10, for reasons which will be made more apparent below.

A spherically shaped sun model 18 is secured to the end of the sun shaft 16, opposite the end of the sun shaft 16 secured to the post 14. The sun model 18 has a diameter scaled with respect to the earth model of the space simulator 10 to represent the sun, the sun shaft 16 supporting the sun model 18 in a predetermined vertical and horizontal plane above the base 12 simulating the position of the sun, as will be made more apparent below.

A circularly shaped calendar plate 20, having a top 22, is secured to a portion of the sun shaft 16 generally between the sun model 18 and the post 14, the sun shaft 18 more particularly extending through a central portion of the calendar plate 20, as shown more clearly in FIGS. 3 and 4. The calendar plate 20 includes a plurality of day indicia 24 inscribed on the top 22, the day indicia 22 preferably including 365 separate day indicia inscribed and equally spaced circumferentially about the top 22 of the calendar plate 20 generally near the outer periphery thereof. The day indicia 24 thus extend circularly about the calendar plate 20, generally near the outer periphery thereof, and a plurality of month indicia 26 are inscribed on the top 22 of the calendar plate 20, the month indicia 26 extending circularly about a portion of the top 22 of the calendar plate 20 and being divided into 12 substantially equal divisions corresponding and representing the 12 months of a calendar year, as shown more clearly in FIG. 4. Each of the 12 divisions of the month indicia 26 is, more particularly, sized to include a predetermined number of day indicia corresponding to the number of days in the particular calendar month. A plurality of season indicia 28 are inscribed on a portion of the top 22 of the calendar plate 20, the season indicia 28 being located generally adjacent the month indicia 26 and indicating the four seasons (summer, autumn, winter and spring) and each of the season indicia 28 being divided and spaced to include the particular calendar months indicated via the month indicia 26 corresponding to the particular season. The calendar plate 20 thus includes day indicia 24, month indicia 26 and season indicia 28 located and spaced on the top 22 thereof to demonstratively provide a visual representation of the calendar days, months and seasons during the operation of the space simulator 10, in a manner similar to the calendar plate described and shown in the U.S. Pat. No. 2,114,082, issued to John B. Mast, referred to before.

An elongated horizontal arm 30, having opposite ends 32 and 34, is rotatingly and journally supported on the base 12. More particularly, the sun shaft 16 journally extends through a central portion of the horizontal arm 30 and the horizontal arm 30 is journally supported on the sun shaft 16 via a pair of bushings 36 and 38, the bushing 36 being disposed about the sun shaft 16 generally adjacent a portion of an upper face 40 of the horizontal arm 30 and the bushing 38 being disposed about a portion of the sun shaft 16 generally adjacent a portion of a lower face 42 of the horizontal arm 30. The horizontal arm 30 is, more particularly, supported on the sun shaft 16 generally below the sun model 18 and below the calendar plate 20 such that each of the opposite ends 32 and 34 thereof extend a distance radially from the sun shaft 16 in generally opposite directions, the horizontal arm 30 being rotatable in rotational directions 44 and 46 about the stationary sun shaft 16 during the operation of the space simulator 10, for reasons and in a manner to be described in greater detail below.

A cylindrically shaped support 48 is secured to a portion of the upper face 40 of the horizontal arm 30, generally near the end 34 thereof, the support 48 extending a distance generally perpendicularly from the upper face 40 of the horizontal arm 30. One end of a calendar indicator 50 is secured to a portion of the support 48, the calendar indicator 50 extending a predetermined distance from the support 48 terminating with a pointer end portion 52. More particularly, the calendar indicator 50 extends from the support 48 and is supported in a horizontal plane generally above the upper face 40 of the horizontal arm 30 via the support 48 and a support flange 54 having one end secured to the upper face 40 of the horizontal arm 30 and the opposite end secured to the calendar indicator 50, as shown more clearly in FIGS. 1 and 3.

The support 48 and the support flange 54 cooperatingly support the calendar indicator 50 in a predetermined horizontal plane with respect to the horizontal planar disposition of the calendar plate 20 such that the pointer end portion 52 of the calendar indicator 50 is disposed generally above the top 22 of the calendar plate 20 and in indicating proximity with respect to the day, month and season indicia 24, 26 and 28 inscribed on the calendar plate 20. The calendar plate 20 has a diameter and is positioned with respect to the calendar indicator 50 such that, as the horizontal arm 30 is rotated in the rotational directions 44 and 46, the pointer end portion 52 of the calendar indicator 50 is rotatingly moved about the calendar plate 20, generally near the outer periphery thereof, the pointer end portion 52 of the calendar indicator 50 being disposed in indicating proximity with respect to one particular day, month and season indicia 24, 26 and 28 at each rotational position of the horizontal arm 30.

A hollow sun simulator 56 is removably secured to the end 34 of the horizontal arm 30, the sun simulator 56 including a planar face 58 and a spherically shaped surface 60. The horizontal arm 30 is more particularly connected to a central portion of the planar face 58 of the sun simulator 56 via a connecting rod 62 connected on one end to the support 48 and on the opposite end to a central portion of the planar face 58 of the sun simulator 56 in one embodiment.

An illumination device 64 (shown in FIGS. 1 and 4) such as a light bulb, for example, is secured within the hollow portion of the sun simulator 56 such as by mounting the illumination device 64 on one end portion of the connecting rod 62 extending through the planar face 58 of the sun simulator 56, as shown in FIG. 4, and, in one form, the sun simulator 56 is constructed of a translucent material.

The sun simulator 56 has a diameter scaled proportional to the diameter of the sun, the diameter of the planar surface 58 being scaled such that a dimension of 1 inch on the sun simulator 56 corresponds to approximately 100,000 miles. The diameter of the planar face 58 of the sun simulator 56 is approximately 8½ inches in one operational embodiment of the space simulator 10, for example.

As shown more clearly in FIGS. 1 and 3, the support 48 includes a conically shaped upper portion 66 extending a distance vertically above the upper face 40 of the horizontal arm 30 and a tape holder 68 is secured to the upper portion 66 of the support 48, generally near the upper end thereof. The tape holder 68 includes a length of tape 70 having a hook 72 secured on one end thereof, and, in one form, a plurality of distance indicating indicia 73 printed thereon (some of the distance indicating indicia being shown in FIG. 2 for the purpose of clarity of description). The distance indicating indicia 73 on the tape 70 is printed and spaced thereon on a scale generally corresponding to the scale of the sun simulator 56. In this form, the tape holder 68 is supported on the horizontal arm 30 generally adjacent the sun simulator 56 such that a predetermined length of tape 70 is extended from the tape holder 68 and the distance indicating indicia 73 generally indicate and are proportional to the relative distance between the hook 72 end of the length of tape 70 and the sun simulator 56, thereby providing demonstrative indication of relative distances compared to the sun simulator 56. It should be noted that the tape 70 is generally considered to be useful with respect to those planets located relatively near the sun since the spacing or distances between the sun and many planets is relatively large rendering a stepped-off distance more practical for demonstration purposes.

The sun shaft 16 extends through a central portion of a main gear 76 and the main gear 76 is securedly affixed to the sun shaft 16. The main gear 76 is supported in a horizontal plane generally below the horizontal arm 30 such that the main gear 76 is stationarily positioned on the sun shaft 16 as the horizontal arm 30 is rotated relative to the sun shaft 16 during the operation of the space simulator 10.

One end portion of an earth shaft 78 extends through an opening (partially shown) formed through the horizontal arm 30, generally near the end 32 thereof, one end portion 80 of the earth shaft 78 extending a distance through the opening (partially shown) in the horizontal arm 30 generally perpendicularly from the lower face 42. The earth shaft 78 is journally supported on the horizontal arm 30 via a pair of bushings 82, one of the bushings 82 being secured generally adjacent the upper face 40 of the horizontal arm 30 and the other bushing 82 being secured generally adjacent the lower face 42 of the horizontal arm 30. Thus, the earth shaft 78 is journally supported via the horizontal arm 30 such that the earth shaft 78 is rotatable relative to the horizontal arm 30 along a rotational axis generally corresponding to the axial axis of the earth shaft 78.

A portion of the earth shaft 78 also extends a predetermined distance generally vertically above the upper face 40 of the horizontal arm 30, and a first and a second angled portion 84 and 86, respectively, are formed on the earth shaft 78, the first angled portion 84 and the second angled portion 86 of the earth shaft 78 being formed and positioned on the earth shaft 78 such that the axial center line of the second angled portion 86 is offset with respect to the axial center line of the earth shaft 78 and such that the second angled portion 86 is disposed and inclined at a predetermined angle relative to the vertically oriented axial axis portion of the earth shaft 78. More particularly, the second angled portion 86 of the earth shaft 78 is disposed at an angle of approximately 23.5° with respect to the vertically oriented axial axis portion of the earth shaft 78 representing the inclination of the axis of rotation of the earth. The earth shaft 78 is journally supported in the horizontal arm 30 for rotating the second angled portion 86, sometimes referred to herein simply as the inclined portion 86, relative to the horizontal arm 30 in a manner maintaining the angular inclination of the second angled portion 86 relative to the sun model 18, for reasons and in a manner to be made more apparent below.

A drive gear 88 is secured to the end of the earth shaft 78 extending from and below the lower face 42 of the horizontal arm 30, the end of the earth shaft 78 being, more particularly, secured to the central portion of the drive gear 88. The drive gear 88 is spaced a predetermined distance from the main gear 76 and is positioned on the earth shaft 78 such that the main gear 76 and the drive gear 88 are each disposed in a substantially horizontal coplanar position, an endless drive chain 90 connected about the main gear 76 and about the drive gear 88 drivingly connecting the main gear 76 and the drive gear 88. As the horizontal arm 30 is rotated in rotational directions 44 and 46 relative to the sun shaft 16, the earth shaft 78 and the drive gear 88 are each rotated about the sun shaft 16 and the main gear 76. Since the main gear 76 and the drive gear 88 are each drivingly interconnected via the endless drive chain 90, rotational movement will be imparted to the earth shaft 78 via the endless drive chain 90 as the drive gear 88 is rotated about the main gear 76 following the rotation of the horizontal arm 30. The rotational movement imparted to the drive gear 88 via the endless drive chain 90 and the interconnection between the main gear 76 and the drive gear 88 via the endless drive chain 90 drivingly rotating the earth shaft 78 relative to the horizontal arm 30, the main gear 76 and the drive gear 88 each being of a predetermined size such that the earth shaft 78 is rotated a predetermined number of revolutions for each revolution of the earth shaft 78, for reasons and in a manner to be made more apparent below.

As shown more clearly in FIGS. 1 and 3, a second gear 92 is secured to the earth shaft 78 generally between the drive gear 88 and the horizontal arm 30, the second gear 92 being disposed in a horizontal plane generally parallel to the planar disposition of the drive gear 88. Thus, the second gear 92 is rotated following the rotational movement of the earth shaft 78 imparted thereto via the driving interconnection between the main gear 76 and the drive gear 88 as the horizontal arm 30 is rotated in the rotational directions 44 and 46 about the sun shaft 16, for reasons to be made more apparent below.

A moon shaft 94 is journally disposed through a portion of the horizontal arm 30 generally near the end 32 thereof, the moon shaft 94 being spaced a predetermined distance from the earth shaft 78 and including a portion extending generally above the upper face 40 and a portion extending generally below the lower face 42 of the horizontal arm 30. A moon drive gear 96 is secured to a portion of the moon shaft 94 below the lower face 42 of the horizontal arm 30, and one end of a gear support 98 is secured to a portion of the lower face 42, the gear support 98 supportingly engaging a portion of the moon shaft 94 to support the moon shaft 94 and the moon drive gear 96 in a predetermined horizontal disposition below the horizontal arm 30. The moon drive gear 96 is supported via the gear support 98 in a horizontal plane substantially coplanar with the second gear 92 secured to the earth shaft 78, the moon drive gear 96 gearingly and meshingly engaging the second gear 92 in an assembled, supported position thereof. A pulley wheel 100 is securely connected to the upper end portion of the moon shaft 94 and supported in a horizontal plane generally above the upper face 40 of the horizontal arm 30. Thus, the moon shaft 94 is rotated via the rotation of the moon drive gear 96 secured thereto, the moon drive gear 96 and the pulley wheel 100 each being rotated via the second gear 92 as the horizontal arm 30 is moved in rotational directions 44 and 46 about the sun shaft 16, during the operation of the space simulator 10.

One end of a hollow fixed shaft 102 is secured to the horizontal arm 30, the fixed shaft 102 extending a distance vertically upwardly from the upper face 40 of the horizontal arm 30. The earth shaft 78, more particularly, extends through and is journally supported within a portion of the hollow portion of the fixed shaft 102, the earth shaft 78 extending above an uppermost end 103 of the fixed shaft 102 as shown more clearly in FIG. 3. The fixed shaft 102 remains in a stationary, fixed position relative to the horizontal arm 30 as the horizontal arm 30 is rotated about the sun shaft 16, for reasons to be made more apparent below.

A pulley wheel 104 is journally and rotatably connected to the stationary fixed shaft 102 and supported thereby above the upper face 40 of the horizontal arm 30 in a horizontal plane substantially coplanar with the pulley wheel 100. A drive belt 106 is connected about a portion of the pulley wheel 100 and about a portion of the pulley wheel 104, the drive belt 106 drivingly interconnecting the pulley wheels 100 and 104 such that the pulley wheel 104 is drivingly rotated relative to the stationary fixed shaft 102 following the rotational movement of the pulley wheel 100. Since the pulley wheel 100 is rotated via the rotational movement of the moon shaft 94, the pulley wheel 100 is rotated and drivingly rotates the pulley wheel 104 in a rotating position of the moon shaft 94 during the operation of the space simulator 10, for reasons and in a manner to be made more apparent below.

An arcuately shaped moon support 108 is secured on one end thereof to a portion of the pulley wheel 104, the moon support 108 extending a predetermined distance arcuately from the fixed shaft 102 and terminating with an outermost end 110. A flange 112 is formed on the outermost end 110 of the moon support 108 and a spherically shaped moon model 114 is connected to the outermost end 110 of the moon support 108. More particularly, one end of a moon support rod 116 is secured to the moon model 114 and the opposite end of the moon support rod 116 is secured to the flange 112 of the moon support 108, thereby securing the moon model 114 to the moon support 108 in a predetermined horizontal and vertical position. Since the moon support 108 supporting the moon model 114 is connected to the pulley wheel 104, the moon model 114 is rotated about the vertically extended portion of the earth shaft 78 as the pulley wheel 104 is drivingly rotated about the fixed shaft 102. The second gear 92, the moon drive gear 96, the moon shaft 94, the pulley wheels 100 and 104 and the drive belt 106 are thus connected to drivingly rotate the moon model 114 relative to the vertically extended portion of the earth shaft 78; the second gear 92, the moon shaft 94, the moon drive gear 96, the pulley wheels 100 and 104 and the drive belt 106 being sometimes referred to herein collectively as the moon drive 118.

The fixed shaft 102 also extends through a central portion of a circularly shaped moon phase indicator plate 120, the moon phase indicator plate 120 being securedly affixed to the fixed shaft 102 and supported thereon in a horizontal plane generally above the horizontal arm 30 and above the moon drive 118. The moon phase indicator plate 120 includes a plurality of moon phase indicia 122 inscribed on a top 124 thereof and spaced generally circumferentially thereabout generally near the outer periphery thereof, as shown in FIG. 4. The moon phase indicia 122 is, more particularly, diagrammatically indicative of the various phases of the moon such as commonly referred to in the art of astronomy as the "last quarter," "crescent," "new moon," "gibbous," "full moon," "first quarter," and the like, for example.

One end of a moon phase indicator 126 is secured to the flange 112 of the moon support 108, the moon phase indicator 126 extending a distance outwardly from the moon support 108 and disposed in a horizontal plane generally above the top 124 of the moon phase indicator plate 120. The curved or arcuately shaped portion of the moon support 108 is more particularly sized and shaped to extend a distance from the fixed shaft 102 below the moon phase indicator plate 120 and curve upwardly for positioning the moon phase indicator 126 and the moon model 114 in predetermined horizontal planar dispositions relative to the other components and assemblies of the space simulator 10. More particularly, the moon phase indicator 126 is positioned and disposed in indicating proximity with respect to the moon phase indicia 122 formed on the top 124 of the moon phase indicator plate 120, the moon phase indicator 126 being rotatingly moved about the outer periphery of the moon phase indicator plate 120 and positioned in indicating proximity with predetermined moon phase indicia 122 at predetermined rotated positions of the moon phase indicator 126 demonstratively indicating the moon phase of predetermined rotated positions of the moon model 114 relative to the earth shaft 78 and the sun shaft 16.

A spherically shaped earth model 130 is connected to the second angled portion 86 of the earth shaft 78 and an earth drive 132 is connected between the earth shaft 78 and the earth model 130 for rotatingly driving the earth model 130 relative to the angularly extended or inclined second angled portion 86 of the earth shaft 78 at a predetermined rotational speed proportionally representing the rotational speed of the earth relative to the earth's axis.

The earth drive 132, more particularly, includes a drive gear 134 secured to a portion of the inclined portion or second angled portion 86 of the earth shaft 78. A bushing 136 is disposed about a portion of the inclined or second angled portion 86 of the earth shaft 78 generally adjacent the earth drive gear 134 and spaced a distance from an uppermost end 138 of the earth shaft 78.

A hollow rotating shaft 142 is journally secured about a portion of the inclined second angled portion 86 of the earth shaft 78, a portion of the second angled portion 86 of the earth shaft 78 journally extending through the hollow portion of the hollow rotating shaft 142. A gear 144 is secured to one end of the hollow rotating shaft 142, the gear 144 drivingly rotating the rotating shaft 142 relative to the second angled portion 86 of the earth shaft 78 in a driven position of the gear 144. The gear 144 and the rotating shaft 142 affixed thereto are each supported a predetermined distance above the earth drive gear 134 via the bushing 136.

A portion of the second angled portion 86 of the earth shaft 78 and a portion of the bushing 136 extend through an opening (not shown) formed through a portion of an earth drive support 150, the earth drive support 150 being securely connected to the bushing 136 so that the earth shaft 78 rotates within the bushing 136. The earth drive support 150 includes a radial portion 152 extending generally radially from the earth shaft 78, as shown more clearly in FIG. 3. A gear 154 is connected to a gear shaft 156, the gear shaft 156 being journally connected to and supported via the radial portion 152 of the earth drive support 150. Another gear 158 is secured to the gear shaft 158, the gear 158 being positioned to meshingly engage the outer periphery of the earth drive gear 134 such that the rotation of the gear 158 drivingly rotates the gear shaft 156 and the gear 154 secured thereto during the operation of the space simulator 10.

The earth drive support 150 also includes an angled portion 160 extending angularly from the radial portion 152 thereof and disposed in a plane spaced a predetermined distance from the planar disposition of the radial portion 152. One end of a gear shaft 162 is journally supported in a portion of the angled portion 160 and a pair of gears 164 and 166 are each secured to the gear shaft 162. The gear 164 is disposed to meshingly engage the gear 154, the gear 164 being rotatingly driven in a driven position of the gear 154 via the meshing engagement therebetween thereby rotating the gear 166. The gear 166 is supported via the earth drive support 150 such that the gear 166 meshingly engages the gear 144, the gear 166 rotatingly driving the gear 144 and the rotating shaft 142 affixed thereto in a rotatingly driven position of the gear 166.

The earth drive support 150 includes an arcuately shaped portion 168 extending a distance radially from the earth shaft 78 in a direction generally opposite the radial portion 152 of the earth drive shaft 150. The outermost end portion of the arcuately shaped portion 168 extends in an upwardly direction at an incline substantially corresponding to the inclination of the second angled portion 86 of the earth shaft 78.

A portion of the rotating shaft 142 extends through an enlarged opening (not shown) formed through a central portion of a circularly shaped time chart 172, the time chart 172 being securely affixed to a portion of the arcuately shaped portion 168 and to a portion of the angled portion 160 of the earth drive support 150. The time chart 172 cooperates to support the earth drive support 150 in a stationary position relative to the rotating shaft 142 and is disposed in a plane substantially perpendicular to the planar disposition of the angularly extending second angled portion 86 of the earth shaft 78.

The time chart 172, as shown more clearly in FIGS. 5 and 6, includes a plurality of time indicating indicia 174 inscribed on a top 176 of the time chart 172, the time indicating indicia 174 being circularly spaced about the time chart 172 generally near the outer periphery of the time chart 172. The time chart 172, in a preferred form, is also divided into two sections indicating "day" and "night," in one preferred embodiment.

One end of a time indicator 178 is secured to a portion of the rotating shaft 142, the time indicator 178 extending a distance generally radially from the rotating shaft 142 and being disposed in a horizontal plane generally above the top 176 of the time chart 172. More particularly, a portion of the time indicator 178 is disposed in indicating proximity with respect to the time indicating indicia 174 inscribed on the time chart 172, the time indicator 178 being rotated via the rotation of the rotating shaft 142 thereby rotatingly moving into indicating proximity with predetermined time indicating indicia 174 providing a visual output indication of the time of the day or night in relative positions of the earth model 130, the moon model 114 and the sun model 18, during the operation of the space simulator 10.

A pointer 180 is secured to the top or uppermost end portion of the rotating shaft 142, the pointer 180 including a setting indicating portion 182 extending radially from the rotating shaft 142 and a rising indicating portion 184 each extending in radially opposite directions from the rotating shaft 142. The pointer 180 is rotated about the second angled portion 86 of the earth shaft 78 during the rotation of the rotating shaft 142, the setting indicating portion 182 and the rising indicating portion 184 providing visually perceivable indications indicating the rising or the setting positions of the sun relative to predetermined positions of the earth or, more particularly, relative to predetermined positions on the earth model 130, the moon model 114 and the sun model 18.

As shown more clearly in FIG. 3, one end of a curved arm 186 is secured to the fixed shaft 102 generally adjacent the connection between the fixed shaft 102 and the top portion 124 of the moon phase indicator plate 120. The curved arm 186 extends angularly upwardly from the fixed shaft 102 terminating with a forked outer end 188. As shown more clearly in FIG. 5, an opening 190 is formed a distance through the forked outer end 188, the opening 190 slidingly receiving a portion of the arcuately shaped portion 168 of the earth drive support 150. The forked outer end 188 of the curved arm 186 engages and maintains the earth drive support 150 and the time chart 172 in a stationary position relative to the fixed shaft 102 while allowing the earth shaft 78 to be rotated relative to the horizontal arm 30, the arcuately shaped portion 168 of the earth drive support 150 moving in generally vertically downwardly and upwardly directions within the opening 190 formed through the forked outer end 188 during the rotation of the earth shaft 78 due to the inclination of the second angled portion 86 of the earth shaft 78. The forked outer end 188 thus secures the earth drive support 150 and the time chart 172 in a stationary position relative to the fixed shaft 102 while simultaneously allowing the hollow rotating shaft 142 and earth model 130 connected thereto to be rotated via the earth drive 132 relative to the earth drive 78 during the operation of the space simulator 10.

The space simulator 10 includes hollow celestial sphere 200 preferably constructed of a transparent material having various celestial bodies depicted thereon in their respective positions relative to the position of the earth model 130 and the moon model 114, some of the celestial bodies being diagrammatically shown in FIG. 3 and indicated therein by the general reference numeral 202 for the purpose of clarity of description. In one form, as shown more clearly in FIGS. 1 and 2, the celestial sphere 200 includes a plurality of celestial meridians, designated generally by the reference numeral 204, and a plurality of celestial declination indications, designated by the general reference numeral 206, the celestial meridians 204 and the celestial declination indications 206 each being inscribed on the spherical surface of the celestial sphere 200.

More particularly, the celestial bodies 202 comprising the various stars and constellations are positioned and included on the celestial sphere 200 as observable from a viewpoint located approximately at a latitude substantially corresponding to the Northern Hemisphere. A line 208 representing the celestial equator is inscribed on the surface of the celestial sphere 200 and a line 210 representing the ecliptic plane is also inscribed on the surface of the celestial sphere 200, the ecliptic plane 210 being the plane of orbit of the earth (earth model 130) about the sun (sun model 18) and the celestial equator 208 representing a plane oriented at an angle of approximately 23.5° with respect to the planar orientation of the ecliptic plane 210. An observer 212 is positioned on the earth model 130 holding a telescope or other such optical instrument to provide a visual indication indicating and orienting an individual with respect to the celestial bodies 202 which might be visible to an observer positioned on the earth at a location substantially corresponding to the position of the observer 212 on the earth model 130.

As shown in FIGS. 1, 2 and 3, a lower hemispherically shaped portion of the celestial sphere 200 is removed forming a lower circularly shaped edge 214 defining an opening 216. The opening 216 has a diameter sized such that the celestial sphere 200 is disposable over the sun model 18, the moon model 114 and the earth model 130 in assembled positions thereof, the celestial sphere 200 being removable in a similar manner by lifting the celestial sphere 200 in a generally vertically upwardly direction while the sun model 18, the moon model 114 and the earth model 130 pass through the opening 216.

One end of a support tube 220 is secured to a portion of the inner peripheral surface of the celestial sphere 200, the support tube 220 extending a distance generally into the hollow portion of the celestial sphere 200 terminating with an end 222. An opening 224 is formed through the end 222 and extends a distance axially into the support tube 220 terminating with a stop surface 226, as shown in FIG. 3. The opening 224 is sized to receive a portion of the inclined second angled portion 86 of the earth shaft 78 generally near the outermost end 138 thereof, the celestial sphere 200 being disposed in an assembled position over the sun model 18, the moon model 114 and the earth model 130 and the end 138 being disposed through the opening 324 of the support tube 220 to a position wherein the end 138 engages the stop surface 226 limiting the movement of the second angled portion 86 through the opening 224 and positioning the celestial sphere 200 in an assembled position supported on a portion of the earth shaft 78. It should be noted that the diameter of the opening 224 is larger than the diameter of the second angled portion 86 of the earth shaft 78 so the earth shaft 78 is rotatingly disposed within the opening 224 while the celestial sphere 200 is maintained in a stationary position relative to the horizontal arm 30 during the operation of the space simulator 10.

A circularly shaped support strap 228 is connected to the inner peripheral surface of the celestial sphere 200 via a plurality of rods 230 circumferentially spaced about the celestial sphere 200, one end of each rod 230 being securely affixed to the celestial sphere 200 and the opposite end of each rod 230 being secured to a portion of the support strap 228 (two of the rods 230 being shown in FIG. 3 for the purpose of clarity of description). The rods 230 thus securedly support the support strap 228 within the hollow portion of the celestial sphere 200 spaced a predetermined distance from the inner peripheral surface thereof.

The support strap 228 extends in a path substantially aligned with the celestial equator 208 and, in one form, a plurality of zodiac indicator plates 232 are secured to the support strap 228, each of the zodiac indicator plates 232 having zodiac indicia printed thereon representing one of the twelve signs of the zodiac. Some of the zodiac indicator plates 232 extend in one generally upwardly direction from the support strap 228 above the celestial equator 208 and the remaining zodiac indicator plates 232 extend in a downwardly direction below the celestial equator 208. Since the equinoxes occur when the earth passes through the celestial equator and the solstices occur when the earth reaches a maximum distance above or below the celestial equator, the positioning of the zodiac indicator plates 232 extending above and below the support strap 228 provides a visually observable indication of the particular signs of the zodiac which are observable during the year above and below the celestial equator 208.

In one form, as shown in FIG. 1, a strip 234 constructed of a metallic material is secured to the inner peripheral surface of the celestial sphere 200 and extends generally circumferentially thereabout. The space simulator 10 also includes a plurality of planet plates 236, each planet plate 236 having a connector 238 constructed of a magnetic material embedded in a portion thereof (one form of a planet plate 236 being shown in FIG. 7). Each of the planet plates 236 are removably attachable to the outer peripheral surface of the celestial globe 200 near the strip 234 via the magnetic interconnection between the strip 234 and the connectors 238. A spherically shaped planet model 240 is embedded in each planet plate 236, each planet model 240 having a diameter representing the diameter of one of the planets scaled on a scale substantially corresponding to the scale of the sun simulator 56, described before.

In one embodiment, an opening 242 is formed through some of the planet plates 236 sized and positioned such that the hook 72 secured on one end of the length of tape 70 is removably attachable to each of the planet plates 236 via the opening 242 formed therethrough, this embodiment being particularly useful with respect to those planets spaced a relatively small distance from the sun, as mentioned before. In a preferred form, each planet plate 236 includes printed indicia providing information relative to the planet represented via the particular planet model 240 embedded in that particular planet plate 236 such as the distance between the planet and the sun.

Operation of the Embodiment of FIGS. 1 Through 7

As the horizontal arm 30 is rotated in rotational directions 44 and 46 about the sun shaft 16, the earth model 130 and the moon model 114 supported on the end 32 of the horizontal arm 30 are each revolved about the sun model 18 supported on the sun shaft 16 demonstratively simulating the revolving of the earth and the moon about the sun. Further, the earth model 130 is supported on the inclined second angled portion 86 of the earth shaft 78 thereby supporting the earth model 130 at a predetermined inclination of substantially 23.5° with respect to a vertical plane.

As the earth revolves about the sun, the inclination of the earth's axis remains constant and inclined in the same direction. Thus, the earth shaft 78 is rotated via the interconnection between the main gear 76 and drive gear 88 provided by the endless drive chain 90 as the horizontal arm 30 is rotated in rotational directions 44 and 46 about the sun shaft 16, the main gear 76 and the drive gear 88 each being constructed such that the earth shaft 78 is rotated with respect to the horizontal arm 30 to maintain the spacial relationship between the earth model 130 rotational axis and the sun model 18 axis or, in other words, between the rotational axis of the rotating shaft 142 and the sun shaft 16.

As the earth model 130 is revolved about the sun model 18 by rotating the horizontal arm 30, the moon model 114 is revolved about the earth model 130, the moon model 114 being revolved by the pulley wheel 104 relative to the vertically extending portion of the earth shaft 78 thereby maintaining the spacial relationship between the earth model 130 and the moon model 114 since the pulley wheel 104 rotates about the fixed shaft 102 which extends in axial alignment with the earth shaft 78. The moon drive 118 is connected to the earth shaft 78 and the revolving of the moon shaft 114 about the earth model 130 is thus directly related to the revolving of the earth shaft 78 as the horizontal arm 30 rotates in rotational directions 44 and 46 about the sun shaft 16. More particularly, the second gear 92, the moon shaft 94, the moon drive gear 96, the pulley wheels 100 and 104 and the drive belt 106 comprising the moon drive 118 are each sized and positioned to multiply the rotational speed of the earth shaft 78 for driving the moon model 114 about the earth model 130 at a rotational speed approximately 12 times faster than the rotational speed of the earth shaft 78 thereby simulating revolving of the moon about the earth as the earth and the moon revolve about the sun, the simulation being visually observable since the moon drive 118 and the connection and relationship of the moon drive 118 to the earth shaft 78 are exposed and readily observable by the individual during the operation of the space simulator 10.

The moon model 114 also revolves about the moon phase indicator plate 120 connected to the fixed shaft 102 and maintained in a stationary position relative to the earth shaft 78 as the horizontal arm 30 is rotated in rotational directions 44 and 46. As the moon model 114 revolves about the moon phase indicator plate 120, the moon phase indicator 126 is simultaneously revolved about and above the moon phase indicator plate 120 due to the connection between the moon phase indicator 126 and the moon support 108 thereby moving the moon phase indicator 126 into indicating proximity with predetermined moon phase indicia 122 providing an observable indication of the moon phase in rotated positions of the earth model 130 and the moon model 114 as the earth model 130 and the moon model 114 rotate about the sun model 18.

The earth model 130 revolves about the second angled portion 86 of the earth shaft 78 in a manner simulating the revolving of the earth about the earth's axis as the earth simultaneously revolves about the sun. The earth model 130 is secured to the rotating shaft 142 and the earth drive 132 is connected to the earth shaft 78 and the rotating shaft 142 to revolve the rotating shaft 142 at a predetermined rotational speed related to the rotational speed of the earth shaft 78 thereby rotating the earth model 130 at a predetermined rotational speed related to the rotational speed of the earth shaft 78 and simulating the rotational speed of the earth about the earth's axis.

The earth drive support plate 150 supports the gears 154, 158, 164 and 166 and the gear shafts 156 and 162 in a manner connecting the earth shaft 78 and the rotating shaft 142 for drivingly rotating the rotating shaft 142 at a rotational speed gearingly related to the rotation of the earth shaft 78 thereby providing an observable relationship between the rotation of the earth shaft 78 to maintain the orientation of the inclination of the second angled portion 86 relative to the sun model 18 constant as the earth model 130 revolves about the sun model 18 and the rotation of the earth model 130 about the earth model 130 rotational axis defined via the rotating shaft 142 and the second angled portion 86. The connection between the forked outer end 188 of the curved arm 186 and the earth drive support 150 is maintained during the rotation of the horizontal arm 30 relative to the sun shaft 16 thereby maintaining the driving relationship of the various components of the earth drive 132 as the horizontal arm 130 is rotated relative to the sun shaft 16.

The time chart 172 is securely affixed to the earth drive support 160, and both are maintained in a stationary position with respect to the horizontal arm 30 while the rotating shaft 142 rotatingly drives the earth model 130 during the revolving of the horizontal arm 30 about the sun shaft 16. The time indicator 178 is rotated via the rotating shaft 142 and thus rotatingly positioned in indicating proximity with predetermined time indicating indicia 174 providing an observable indication of the time of the day and the night at predetermined rotated positions of the earth model 130, the moon model 114 and the sun model 18 during the rotation of the horizontal arm 30 about the sun shaft 16.

Description of FIGS. 8 Through 13

Shown in FIGS. 8, 9 and 10 is a modified space simulator 10a constructed similar to the space simulator 10 described in detail before, the salient differences being that the space simulator 10a includes a modified zodiac indicator plate and planet model support 250 for supporting the zodiac indicator plates 232a and a modified sun simulator 56a attached to one end of the horizontal arm 30. The zodiac indicator plate and planet model support 250 is, more particularly, constructed to support the zodiac indicator plates 232a in a predetermined, spaced relationship positioned circumferentially about the celestial sphere 200, the zodiac indicator plates 232a being constructed to provide an indication of the orientation and description of the various signs of the zodiac in a manner as described in detail before with respect to the zodiac indicator plates 232 attached to the support strap 228 of the space simulator 10.

More particularly, the zodiac indicator plate and planet model support 250 is secured to the outer peripheral surface of the celestial sphere 200 and extends circumferentially about the outer peripheral surface of the celestial sphere 200 generally along the eliptic plane 210. The zodiac indicator plate and planet model support 250 includes a strip 234a and a support strap 228a, the strip 234a being constructed of a metallic material providing a peripheral surface extending about the celestial sphere 200 positioned such that each of the planet plates 236 is removably attachable to the strip 234a via a magnetic interconnection between the strip 234a and connectors 238, secured to the planet plates 236, and such that modified planet plates 236a and 236b supporting modified planet models 240a and 240b are each removably attachable to the strip 234a via a magnetic interconnection provided via connectors 240a and 240b secured to the planet plates 236a and 236b (the modified planet plates 236a and 236b and the modified planet models 240a and 240b being shown in greater detail in FIGS. 8, 12 and 13, and constructed in a manner to be described in greater detail below).

The strip 234a and a support strap 228a are each secured to the outer peripheral surface of the celestial sphere 200 via a plurality of spaced, generally triangularly shaped support arms 254, the space simulator 10a more particularly including four support arms 254 spaced generally at 90° intervals about a portion of the outer peripheral surface of the celestial sphere 200, as shown more clearly in FIG. 8. The support arms 254 are each constructed similarly and each of the support arms 254 includes an arcuately shaped edge 256, an upper edge 258 and an outer edge 260, as shown more clearly with respect to the enlarged typical support arm 254 as shown in FIG. 11. The arcuately shaped edge 256 of each of the support arms 254 is shaped to matingly abut a portion of the outer peripheral surface of the celestial sphere 200 such that, in an assembled position of each of the support arms 254, each of the support arms 254 is secured to the outer peripheral surface of the celestial sphere 200 generally along the arcuately shaped edges 256 thereof and the upper edges 258 of each of the support arms 254 is disposed in a generally horizontal coplanar disposition about the celestial sphere 200. A slot 262 is formed through a portion of the upper edge 258 of each of the support arms 254 and a recess 264 is formed in a portion of the arcuately shaped edge 256 of each of the support arms 254.

The strip 234a is circumferentially shaped and has a diameter greater than the diameter formed via the outer peripheral surface of the celestial sphere 200. A portion of the strip 234a is disposed in each of the slots 262 in an assembled position of the strip 234a connected to the support arms 254 and the strip 234a is supported via the support arms 254 in a predetermined horizontal disposition extending about the outer peripheral surface of the celestial sphere 200.

The support strap 228a is also circumferentially shaped and has a diameter greater than the diameter formed via the outer peripheral surface of the celestial sphere 200. The support strap 228a is disposed about the outer peripheral surface of the celestial sphere 200 and a portion of the support strap 228a is disposed within the recesses 264 formed in the support arms 254. Portions of the support strap 228a are disposed within the recesses 264 and secured therein to the support arms 254, the support arms 254 cooperating to support the support strap 228a in an assembled position extending circumferentially about the outer peripheral surface of the celestial sphere 200.

In one preferred form and as shown in the drawings, the strip 234a is supported via the support arms 254 spaced a distance 268 from the outer peripheral surface of the celestial sphere 200. The support strap 228a supported via the support arms 254 spaced a distance 270 from the arcuately shaped edge 256 of each of the support arms 254, the support arms 254 spacing the support strap 228a approximately the distance 270 from the outer peripheral surface of the celestial sphere 200. The distance 270, as shown in FIG. 11, represents approximately the average distance or spacing between the arcuately shaped edge 256 and the support strap 228a since the support strap 228a is secured to the outer edge 260 and oriented at an angle with respect to the disposition of the upper edge 258 and with respect to the orientation of the strip 234a.

The distance 270, in one preferred form, is less than the distance 268, each of the support arms 254 supporting the strip 234a in an assembled position spaced the distance 268 from the outer peripheral surface of the celestial sphere 200 and supporting the support strap 228a in an assembled position spaced a lesser distance 270 as compared to the distance 268 from the outer peripheral surface of the celestial sphere 200. The support strap 228a is also secured to and supported via each of the support arms 254 in a position spaced an average distance 272 from the upper edges 258 of each of the support arms 254, thereby spacing the support strap 228a approximately the distance 272 below the strip 234a.

In one preferred form, as indicated diagrammatically in FIG. 9, the strip 234a includes a plurality of indicia, indicated via the general reference numeral 276, printed on an outer surface 274 thereof, the indicia 276 on the outer surface 274 being spaced to divide the strip in 10° intervals from 0° through 360° circumferentially about the strip 234a extending the indicia 276 circumferentially about the outer peripheral surface of the celestial sphere 200, as indicated in FIGS. 8 and 9. The support strap 228a and the strip 234a are each supported about the outer peripheral surface of the celestial sphere 200 in and generally aligned with the eliptic plane 210 (the eliptic plane 210 being shown in FIG. 1 and described in detail before). The indicia 276 are located and disposed on the strip 234a and the strip 234a is oriented and disposed with respect to the celestial sphere 200 such that the indicia 276 indicating the 0° mark indicates the point of autumnal equinox, the indicia 276 extending from the 0° mark in an easterly or clockwise direction about the strip 234a dividing the strip 234a at 10° intervals.

The divisions indicated via the indicia 276 on the strip 234a are, in a preferred form, still further divided into 12 sections (not specifically shown in the drawings) wherein each section extends 30° about the outer peripheral surface of the strip 234a, each of these 12 divisions designating those portions of the celestial sphere 200 associated with the signs of the zodiac as indicated via the zodiac indicator plates 232a. The zodiac indicator plates 232a are each secured on one end thereof to a portion of the strip 234a and secured on the opposite ends thereof to the support strap 228a such that each of the zodiac indicator plates 232a is connected to the strip 234a and the support strip 228a and supported thereby, each of the zodiac indicator plates 234a being located and spaced circumferentially about the outer peripheral surface of the celestial sphere 200. The zodiac indicator plates 232a are, more particularly, connected to the strip 234a and positioned to identify and designate the portions of the celestial sphere 200 associated with the particular zodiac signs indicated via the zodiac indicator plates 232a and further designated and indicated via the 12 sections or divisions indicated via the indicia 276 disposed on the strip 234a. The zodiac indicator plates 232a are disposed within the 12 30° sections formed via some of the indicia 276 on the strip 234a such that the zodiacal indicia printed on each of the zodiac indicator plates 232a along with the particular zodiacal signs provide visual indications of the particular zodiac signs associated with the designated portions of the celestial sphere 200, in a manner similar to that described before with respect to the zodiac indicator plates 232a of the space simulator 10a.

As shown in FIGS. 8 and 10, the sun simulator 56a is constructed similar to the sun simulator 56, described in detail before, and includes a spherically shaped outer peripheral surface 60a, one of the differences being that the sun simulator 56a has a hollow portion formed in the planar surface 58a, as indicated in FIG. 10. The sun simulator 56a is also preferably constructed of a metallic material and is connected to the end 34 of the horizontal arm 30 via a modified connecting rod 62a.

One end of the connecting rod 62a is secured to the lower face 42 of the horizontal arm 30 generally near the end 34 via a fastener 282 and the opposite end of the connecting rod 62a is secured to the inner peripheral surface of the sun simulator 56a such as via a welding interconnection, for example. The connecting rod 62a is constructed to provide the interconnection between the sun simulator 56a and the horizontal arm 30 and to support the sun simulator 56a in a predetermined horizontal disposition with respect to the other components and assemblies of the space simulator 10a.

In one form, as shown in FIGS. 8 and 10, the sun simulator 56a is supported via the connecting rod 62a in a spacial disposition with respect to the other components and assemblies of the space simulator 10a in a manner similar to that described before with respect to the orientation and disposition of the sun simulator 56 of the space simulator 10. In one other form (not shown in the drawings), the sun simulator 56a is supported a distance above the upper face 40 of the horizontal arm 30 and positioned such that the center of the sun simulator 56a is located on approximately the same horizontal plane and generally aligned with the sun model 18, the sun model 18 being shown in FIGS. 3 and described before with respect to the space simulator 10. In this last-mentioned embodiment, the orientation and disposition of the sun simulator 56a enhances the perceivability indicating that the sun simulator 56a is an enlargement representing the sun as indicated via the sun model 18.

As shown more clearly in FIGS. 8 and 10, a counter weight 284 is secured to the end 34 of the horizontal arm 30, the counter weight 284 being, more particularly, secured between the cylindrical support 48a and the upper face 40 of the support arm 30. The cylindrical support 48a is constructed similar to the cylindrical support 48 of the space simulator 10, the salient difference being that the cylindrical support 48a does not include the tape holder 68 and a retaining ring 286 is secured to a portion of the cylindrical support 48a, the retaining ring 286 engaging the counter weight 284 and securing the counter weight 284 in an assembled position between the retaining ring 286 and the upper face 40 of the support arm 30. In one other form (not shown), the counter weight 284 is secured to the lower face 42 of the horizontal arm 30 generally near the end 34 and, in either event, the counter weight 284 is constructed and positioned to balance the weight supported via the ends 32 and 34 of the horizontal arm 30.

As shown in FIGS. 8, 9, 12 and 13, the space simulator 10a also includes modified planet models 240a and 240b and modified planet model supports or planet plates 236a and 236b. The planet models and planet model supports shown in connection with the space simulator 10a can also be utilized with the space simulator 10, described before, as will be made more apparent below.

As shown more clearly in FIG. 12, one of the modified planet model 240a is secured to one end of a pin 288, the opposite end of the pin 288 being securedly affixed to an upper face 290 at one end of a modified planet plate 236a. A pair of connectors 238a are secured to a lower face 292 of the planet plate 236a, one of the connectors 238a being secured to each end of the planet plate 236a. The connectors 238a are each constructed of a magnetic material for magnetically securing the planet plate 236a and the planet model 240a connected thereto to a portion of the strip 234a surrounding the celestial sphere 200. The planet model 240a is, more particularly, a model of the planet Saturn and, in this instance, the planet plate 236a includes information and distance indicia (not shown) relating to the planet Saturn, including the planet name, sign, actual distance and scaled distance from the sun (the scaled distance relating to the distance between the planet model 240a and the sun simulator 58a scaled to the relative sizes of the sun simulator 58a and the planet model 240a.

Another modified planet model 240b is shown in FIG. 13 connected to a planet plate 236b having an upper surface 294 and a lower surface 296. The planet model 240b more particularly includes a spherically shaped scaled planet model 298 connected to one end of a pin 300, the opposite end of the pin 300 being secured to the upper face 294 of the planet plate 236b, generally near one end thereof. A spherically shaped satellite model 302 is secured to one end of a pin 304, the opposite end of the pin 304 being secured to a portion of the upper face 294 of the planet plate 236b generally near one end of the planet plate 236 opposite the end supporting the scaled planet 298.

The scaled planet 298 is spaced a distance 306 from the satellite model 302, the distance 306 corresponding to the scaled distance between the particular planet represented via the scaled planet 298 and the satellite represented via the satellite model 302. The printed indicia on the upper surface of the planet plate 236b (not shown in the drawings) indicates the name, the distance and the size of the satellite represented via the satellite model 302 from the planet represented via the scaled planet 298 as well as indicia relating to the scaled planet 298 such as the distance and the scaled distance between the planet represented via the scaled planet 298 and the sun, the scaled distance corresponding to the distance between the sun simulator 56a and the scaled planet 298 scaled relative to the respective sizes of the sun simulator 56a and the planet model 240b.

A connector 238b is secured to the lower surface 296 of the planet plate 236b, the connector 238b being constructed of a magnetic material for removably connecting the planet model 240b to the strip 234a in a manner similar to that described before with respect to the planet models shown in FIGS. 7 and 12 with respect to the space simulators 10 and 10a. The planet models 240, 240a and 240b are also constructed and the connectors 238, 238a and 238b are positioned on the planet plates 236, 236a and 236b, respectively, such that the connectors 238, 238a and 238b are each removably connectable to the outer peripheral surface of the sun simulator 56a, in one operational form of the invention as shown in FIG. 8 with respect to the planet model 240b.

Changes may be made in the construction and arrangement of the various parts and components described herein without departing from the spirit and the scope of the invention as defined in the following claims.

What is claimed is:

1. A space simulator, comprising:
    a base;
    a sun shaft secured to the base and extending a distance generally vertically therefrom;
    a sun model secured to the end of the sun shaft, opposite the end of the sun shaft secured to the base;
    a horizontal arm, having opposite ends, journally supported on a portion of the sun shaft and rotatable about the sun shaft in a rotated position of the horizontal arm;
    an earth shaft, having a portion journally extending through a portion of the horizontal arm, a portion of the earth shaft shaped at a predetermined angle forming an inclined portion representing the inclination of the earth's rotational axis;
    means having a portion connected to the sun shaft and another portion connected to the earth shaft rotating the earth shaft during the rotation of the horizontal arm about the sun shaft;
    a hollow rotating shaft rotatably supported on the inclined portion of the earth shaft, the inclined portion of the earth shaft extending through the hollow portion of the rotating shaft;
    an earth model secured to the rotating shaft and being rotated about the inclined portion of the earth shaft via the rotating shaft; and
    earth drive means having a portion connected to the earth shaft and another portion connected to the rotating shaft drivingly rotating the rotating shaft and the earth model connected thereto in a rotated position of the earth shaft simulating the rotation of the earth, comprising:
    an earth drive gear secured to the earth shaft;
    a gear secured to the rotating shaft drivingly rotating the rotating shaft in a driven position thereof;

gear means having a portion gearingly connected to the earth drive gear and another portion gearingly connected to the gear secured to the rotating shaft rotatingly driving the gear secured to the rotating shaft in a rotated position of the earth shaft;
    an earth drive support having a portion supportingly connected to the gear means; and
    means having a portion connected to the earth drive support and a portion connected to the horizontal arm maintaining the position of the earth drive support stationary relative to the horizontal arm during the rotation of the horizontal arm about the sun shaft.

2. The space simulator of claim 1 wherein the means maintaining the position of the earth drive support stationary relative to the horizontal arm during the rotation of the horizontal arm is defined further to include:

means journally connected to the inclined portion of the earth shaft having a portion connected to a portion of the earth drive support supporting the earth drive support in a predetermined spacial relationship relative to the earth shaft, the earth drive gear and the gear secured to the rotating shaft;
    a hollow fixed shaft having one end connected to the horizontal arm, a portion of the earth shaft journally extending through the hollow portion of the fixed shaft; and
    a curved arm, having one end connected to the fixed shaft and the opposite end portion slidingly connected to a portion of the earth drive support maintaining the earth drive support in a stationary position relative to the horizontal arm during the rotation of the horizontal arm about the sun shaft.

3. The space simulator of claim 2 wherein the means journally connected to the inclined portion of the earth shaft and supportingly connected to the earth drive support is defined further as a time chart having a plurality of time indicating indicia inscribed and spaced thereon indicating the time of day and night; and wherein the space simulator is defined further to include: a time indicator, having one end connected to the rotating shaft, the time indicator supported a distance generally above the time chart and extending a distance radially from the rotating shaft terminating with a pointer end portion, the time indicator rotated via the rotating shaft to predetermined positions with respect to the time indicating indicia demonstratively indicating the time of day and night in rotated positions of the horizontal arm.

4. The space simulator of claim 1 defined further to include:
    a hollow fixed shaft having one end connected to the horizontal arm, a portion of the earth shaft journally extending through the hollow portion of the fixed shaft;
    a moon shaft journally extending through a portion of the horizontal arm spaced a distance from the earth shaft;
    a second gear secured to the earth shaft;

a moon drive gear secured to the moon shaft meshingly engaging the second gear, the second gear rotatingly driving the moon shaft via the moon drive gear in a rotated position of the earth shaft;

a pulley wheel journally connected to the fixed shaft and rotated relative thereto in a driven position thereof;

a pulley wheel connected to the moon shaft;

a drive belt connecting the pulley wheel connected to the moon shaft and the pulley wheel connected to the fixed shaft drivingly rotating the pulley wheel connected to the fixed shaft in a rotating position of the moon shaft;

a moon support having one end connected to the pulley wheel connected to the fixed shaft and rotatable relative thereto; and a moon model connected to the end of the moon support opposite the end connected to the pulley wheel, the moon support supporting the moon model in a predetermined spacial relationship with respect to the earth model and revolving the moon model about the earth model in a rotating position of the pulley wheel connected to the fixed shaft.

5. The space simulator of claim 4 defined further to include:

a moon phase indicator plate secured to the fixed shaft, having a plurality of moon phase indicia inscribed and spaced thereon indicating the moon phases; and a moon phase indicator having one end connected to the moon support and the opposite end supported above the moon phase indicator plate in indicating proximity with the moon phase indicia inscribed thereon, the moon phase indicator rotated via the moon support to predetermined positions with respect to the moon phase indicia demonstratively indicating the moon phase in rotated positions of the horizontal arm.

6. The space simulator of claim 1 defined further to include: a hollow celestial sphere, having an outer peripheral surface, celestial bodies printed thereon and a portion connected to a portion of the earth shaft supporting the celestial sphere and the earth model disposed within the hollow portion of the celestial sphere in a predetermined spacial relationship demonstratively showing the spacial relationship between the earth model and the celestial bodies.

7. The space simulator of claim 6 defined further to include: a support strap connected to the celestial sphere and extending about a portion thereof; and a plurality of spaced zodiac indicator plates, each of the zodiac indicator plates connected to a portion of the support strap and indicating the relative position of each of the signs of the zodiac relative to the celestial bodies inscribed on the celestial sphere.

8. The space simulator of claim 6 defined further to include:

a sun simulator secured to one end portion of the horizontal arm having a circularly shaped portion of a diameter scaled proportional to the diameter of the sun; and a plurality of planet models, each planet model being of a size scaled to represent the size of a predetermined planet, the scale of the planet models substantially corresponding to the scale of the scaled diameter of the sun simulator portion.

9. The space simulator of claim 8 defined further to include: a strip of metallic material connected to the celestial sphere; a plurality of planet plates, each of the planet models secured to one of the planet plates; a plurality of connectors, each of the connectors constructed of a magnetic material and secured to one of the planet plates removably attaching each planet plate to the celestial sphere via the magnetic bond between the connectors and the strip of metallic material.

10. The space simulator of claim 6 defined further to include:

a plurality of support arms, each support arm connected to the outer peripheral surface of the celestial sphere;

a support strap connected to the support arms extending circumferentially about the outer peripheral surface of the celestial sphere;

a strip of metallic material connected to the support arms, spaced a distance from the support strap, and extending circumferentially about the outer peripheral surface of the celestial sphere;

a plurality of zodiac indicator plates, each of the zodiac indicator plates connected to the support strap and to the strip of metallic material and extending therebetween, each zodiac indicator plate indicating the relative position of each of the signs of the zodiac relative to the celestial bodies inscribed on the celestial sphere;

a plurality of planet models, each planet model being of a size scaled to represent the size of a predetermined planet, the scale of the planet models substantially corresponding to the scale of the scaled diameter of the sun simulator portion; and a plurality of connectors, each of the connectors constructed of a magnetic material and secured to one of the planet plates removably attaching each planet plate to the celestial sphere via the magnetic bond between the connectors and the strip of metallic material.

11. A space simulator, comprising:

a base;

a sun shaft secured to the base and extending a distance generally vertically therefrom;

a sun model secured to the end of the sun shaft, opposite the end of the sun shaft secured to the base;

a horizontal arm, having opposite ends, journally supported on a portion of the sun shaft and rotatable about the sun shaft in a rotated position of the horizontal arm;

an earth model supported on one end portion of the arm rotatable about the sun shaft in a rotated position of the horizontal arm;

a moon model supported on said one end portion of the horizontal arm rotatable about the earth model;

a sun simulator secured to one end portion of the horizontal arm opposite the end having the earth model and the moon model secured thereto, having a circularly shaped portion of a diameter scaled proportional to the diameter of the sun; and a plurality of planet models, each planet model being of a size scaled to represent the size of a predetermined planet, the scale of the planet models substantially corresponding to the scale of the scaled diameter of the sun simulator portion, and each of the planet models positionable a scaled distance from the sun simulator representing the distance between the planet represented by the planet model and the sun thereby demonstratively providing a scaled representation of the planets, the sun and the distances separating the planets and the sun.

12. The space simulator of claim 10 wherein the sun simulator is defined further as being hollow, partially spherically shaped and constructed of a translucent material; and wherein the space simulator is defined further to include: illumination means supported within the hollow portion of the sun simulator illuminating the sun simulator in one position thereof.

13. The space simulator of claim 10 defined further to include: a hollow celestial sphere having celestial bodies printed thereon, the earth model and the moon model being supported within the hollow portion of the celestial sphere demonstratively showing the spacial relationship between the earth model, the moon model and the celestial bodies.

14. The space simulator of claim 10 wherein the scale of the scaled diameter portion of the sun simulator is defined further as being on a scale of approximately 1 inch representing approximately 100,000 miles.

* * * * *